US012312664B2

(12) United States Patent
Kim et al.

(10) Patent No.: US 12,312,664 B2
(45) Date of Patent: May 27, 2025

(54) CAM RING AND PLATE MODULE FOR VEHICLE VACUUM PUMPS, AND METHOD OF MANUFACTURING THE SAME

(71) Applicants: HYUNDAI MOTOR COMPANY, Seoul (KR); KIA CORPORATION, Seoul (KR); YOUNGSHIN PRECISION CO., LTD., Gyeongju-si (KR)

(72) Inventors: Hak Soo Kim, Seoul (KR); Go Woon Jung, Hwaseong-si (KR); Jin Hyeon Lee, Seongnam-si (KR); Seung Yong Shin, Gyeongju-si (KR); Seung Woo Lee, Gumi-si (KR); O Su Jang, Pohang-si (KR)

(73) Assignees: HYUNDAI MOTOR COMPANY, Seoul (KR); KIA CORPORATION, Seoul (KR); YOUNGSHIN PRECISION CO., LTD., Gyeongju-si (KR)

( * ) Notice: Subject to any disclaimer, the term of this patent is extended or adjusted under 35 U.S.C. 154(b) by 0 days.

(21) Appl. No.: 18/422,722

(22) Filed: Jan. 25, 2024

(65) Prior Publication Data

US 2025/0122601 A1 Apr. 17, 2025

(30) Foreign Application Priority Data

Oct. 16, 2023 (KR) ........................ 10-2023-0137411

(51) Int. Cl.
*C22C 38/22* (2006.01)
*C23C 8/18* (2006.01)
*F04C 18/344* (2006.01)

(52) U.S. Cl.
CPC ................ *C22C 38/22* (2013.01); *C23C 8/18* (2013.01); *F04C 18/344* (2013.01); *F04C 2220/12* (2013.01); *F05C 2201/0409* (2013.01); *F05C 2201/0436* (2013.01); *F05C 2201/0439* (2013.01)

(58) Field of Classification Search
CPC ......... C22C 38/22; C23C 8/18; F04C 18/344; F05C 2201/0409; F05C 2201/0436; F05C 2201/0439
See application file for complete search history.

(56) References Cited

U.S. PATENT DOCUMENTS 4,861,372 A * 8/1989 Shimomura ............ F01C 21/08 419/29
5,997,262 A 12/1999 Finkbeiner et al.
(Continued)

FOREIGN PATENT DOCUMENTS

EP 0641266 B1 4/2003
JP H 08-144964 A 6/1996
(Continued)

*Primary Examiner* — Mary A Davis
(74) *Attorney, Agent, or Firm* — MCDONNELL BOEHNEN HULBERT & BERGHOFF LLP

(57) ABSTRACT

A cam ring and plate module for vehicle vacuum pumps in which, when an oxide layer formed through steam treatment comes into contact with a carbon or graphite material, a uniform carbon layer is stacked on the oxide layer so as to improve corrosion resistance, wear resistance, hardness and seal resistance.

5 Claims, 8 Drawing Sheets

(56) References Cited

U.S. PATENT DOCUMENTS

| | | | | |
|---|---|---|---|---|
| 8,172,561 | B2 * | 5/2012 | Saito | F04C 2/3441 418/179 |
| 8,491,695 | B2 * | 7/2013 | Saito | F04C 2/3446 418/82 |

FOREIGN PATENT DOCUMENTS

| | | | |
|---|---|---|---|
| JP | 2004-197670 | A | 7/2004 |
| KR | 10-0497789 | B1 | 6/2005 |

* cited by examiner

Prior Art
Comparative Example

Prior Art
Comparative Example

CAM RING AND PLATE MODULE FOR VEHICLE VACUUM PUMPS, AND METHOD OF MANUFACTURING THE SAME

CROSS REFERENCE TO RELATED APPLICATIONS

This application claims under 35 U.S.C. § 119(a) the benefit of priority to Korean Patent Application No. 10-2023-0137411 filed on Oct. 16, 2023, the entire contents of which are incorporated herein by reference.

BACKGROUND

(a) Technical Field

The present disclosure relates to a cam ring and plate module for vehicle vacuum pumps in which, when an oxide layer formed through steam treatment comes into contact with a carbon or graphite material, a uniform carbon layer is stacked on the oxide layer so as to improve corrosion resistance, wear resistance, hardness and seal resistance, and a method of manufacturing the same.

(b) Background Art

A wet pump, which operates a brake system using hydraulic pressure generated by transfer of engine oil, was mainly used as vacuum pumps, which control conventional mechanical brake systems, but has recently been advanced to an electronic vacuum pump and replaced by a dry pump, which operates a brake system using pressure of air generated due to rotation of a rotor and frictional force of vanes by inhaling and transferring air instead of engine oil causing pollution and contamination.

Iron (Fe) products which are commonly used have a risk of rapid abrasion of metals, friction noise between the metals, and explosion due to friction sparks between the metals, in the case of dry friction between the metal (a plate in a stuffing box in a pump) and the metal (a rotor generating inner rotational force) under high-speed rotation, and are thus difficult to apply, and therefore, research on replacement of the iron products with sintered stainless steel materials has been conducted.

However, sintered stainless steel materials have various problems, such as difficulty in securing vacuum due to a low density and excessive pores formed on the surfaces of the sintered stainless steel materials, and a possibility of damaging vanes formed of a carbon material due to rust preventive oil.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a cam ring and a plate belonging to a pump unit except for a cover unit and a motor unit in an electronic vacuum pump for vehicles, and more particularly, a cam ring and plate module for vehicle vacuum pumps having a surface on which an iron-based oxide layer is formed so as to improve corrosion resistance, wear resistance, hardness and seal resistance when coming into contact with a carbon or graphite material.

It is another object of the present disclosure to provide a method of manufacturing a cam ring and plate module for vehicle vacuum pumps which includes forming an iron-based oxide layer on a cam ring and a plate using high-temperature steam.

In one aspect, the present disclosure provides a cam ring and plate module for vehicle vacuum pumps, including a cam ring including an accommodation space configured to receive a rotor and vanes, and a diaphragm configured to surround the accommodation space, an upper plate disposed at one side of the cam ring and configured to seal the accommodation space, and a lower plate disposed at a opposite side of the cam ring and configured to seal the accommodation space.

In a preferred embodiment, the cam ring, the upper plate and the lower plate may include an iron-based base material including molybdenum.

In another preferred embodiment, the iron-based base material may include 0.6 to 0.8 wt % of carbon (C), 0.7 to 1.0 wt % of chrome (Cr), 0.1 to 0.2 wt % of molybdenum (Mo), and a balance of iron (Fe) and other inevitable impurities, based on 100 wt % of a total composition of the iron-based base material.

In still another preferred embodiment, the cam ring, the upper plate and the lower plate may include an oxide layer including magnetite ($Fe_3O_4$) formed on surfaces thereof.

In yet another preferred embodiment, the average surface roughness Ra of the oxide layer may be equal to or more than 0.12 μm.

In still yet another preferred embodiment, the cam ring, the upper plate and the lower plate may include an oxide layer including magnetite ($Fe_3O_4$) formed on surfaces thereof, and a carbon layer stacked on the oxide layer.

In a further preferred embodiment, the average surface roughness Ra of the carbon layer may be less than 0.05 μm.

In another aspect, the present disclosure provides a method of manufacturing a cam ring and plate module for vehicle vacuum pumps, including forming a molded body having the shape of a cam ring or a plate from an iron-based base material including molybdenum using a press die, and forming an oxide layer on a surface of the molded body by performing steam treatment on the molded body.

In a preferred embodiment, the steam treatment may be performed by applying steam ($H_2O$) of a temperature of 450 to 600° C. to the molded body.

In another preferred embodiment, the steam treatment may be performed for 20 to 60 minutes.

In still another preferred embodiment, the method may further include stacking a carbon layer on the oxide layer by causing the molded body having the oxide layer formed thereon to come into contact with carbon or graphite.

Other aspects and preferred embodiments of the disclosure are discussed infra.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
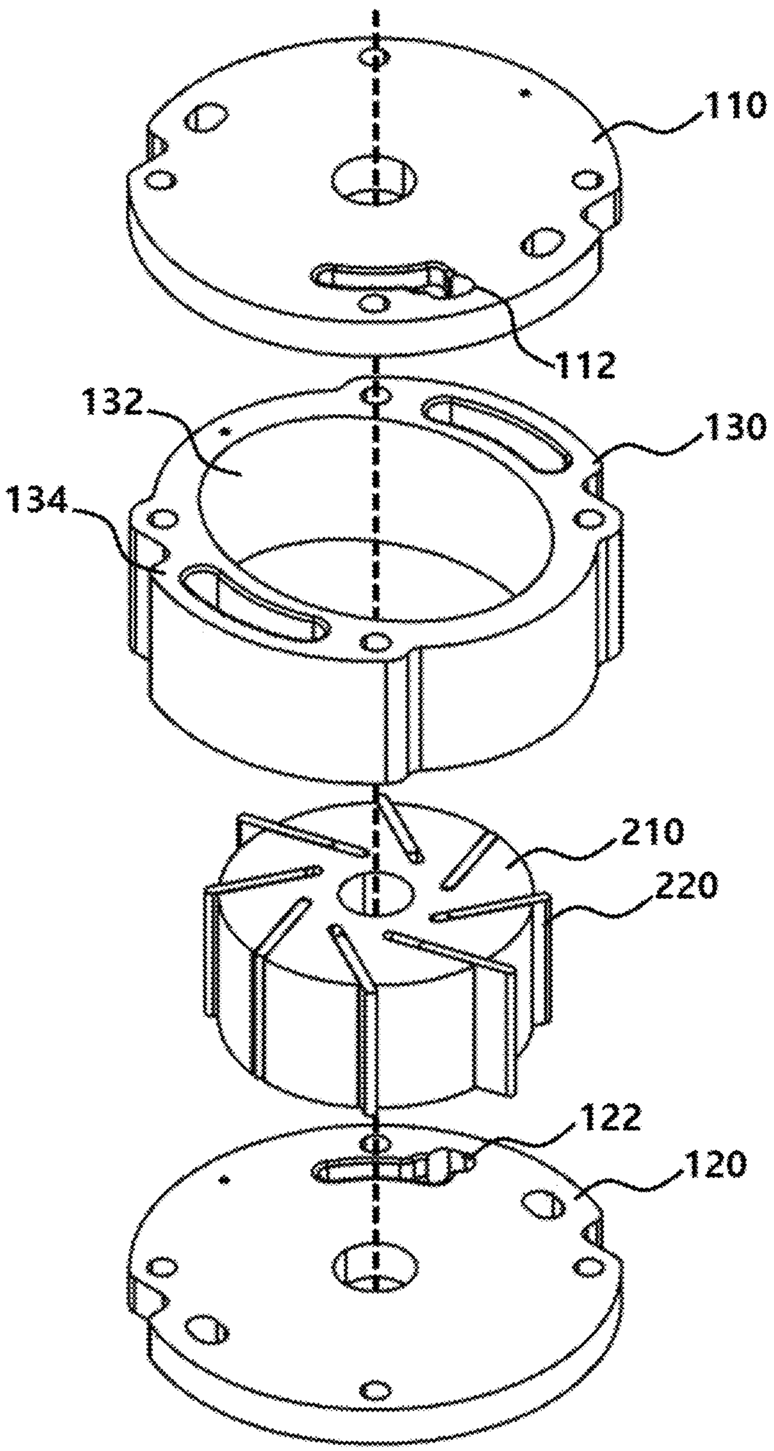
FIG. 1 is an exploded perspective view of a cam ring and plate module for vehicle vacuum pumps according to one embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The above-described objects, other objects, advantages and features of the present disclosure will become apparent from the descriptions of embodiments given hereinbelow with reference to the accompanying drawings. However, the present disclosure is not limited to the embodiments disclosed herein and may be implemented in various different forms. The embodiments are provided to make the description of the present disclosure thorough and to fully convey the scope of the present disclosure to those skilled in the art.

In the drawings, the same or similar elements are denoted by the same reference numerals even though they are depicted in different drawings. In the drawings, the dimensions of structures may be exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the disclosure. Singular expressions may encompass plural expressions, unless they have clearly different contextual meanings.

In the following description of the embodiments, terms, such as "including", "comprising" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are obtained from essentially different things are reflected and thus it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

In the following description of the embodiments, it will be understood that, when the range of a variable is stated, the variable includes all values within the stated range including stated end points of the range. For example, it will be understood that a range of "5 to 10" includes not only values of 5, 6, 7, 8, 9 and 10 but also arbitrary subranges, such as a subrange of 6 to 10, a subrange of 7 to 10, a subrange of 6 to 9, and a subrange of 7 to 9, and arbitrary values between integers which are valid within the scope of the stated range, such as 5.5, 6.5, 7.5, 5.5 to 8.5, and 6.5 to 9. Further, for example, it will be understood that a range of "10% to 30%" includes not only all integers including values of 10%, 11%, 12%, 13%, . . . 30% but also arbitrary subranges, such as a subrange of 10% to 15%, a subrange of 12% to 18%, and a subrange of 20% to 30%, and arbitrary values between integers which are valid within the scope of the stated range, such as 10.5%, 15.5%, and 25.5%.

Vehicle vacuum pumps may include electronic vehicle vacuum pumps. The electronic vehicle vacuum pump may serve to create a vacuum so as to improve brake performance, when a vacuum in a brake booster is insufficient in a braking system of a vehicle. For example, the electronic vehicle vacuum pump may help a vehicle having an insufficient negative pressure of a brake, such as a gasoline turbo vehicle, to stably operate the brake. For example, the vehicle vacuum pump may include a cover unit provided with an inlet through which air is input to the vehicle vacuum pump and an outlet through which air is discharged to the outside, a pump unit installed in the cover, and a motor unit configured to provide power so as to drive the pump unit. Concretely, the pump unit may include a cam ring, a rotor and vanes received in the cam ring, and plates configured to seal the cam ring.

A cam ring and plate module for vehicle vacuum pumps according to the present disclosure may include a cam ring including an accommodation space configured to receive a rotor and vanes, and a diaphragm configured to surround the accommodation space, an upper plate disposed at one side of the cam ring and configured to seal the accommodation space, and a lower plate disposed at the other side of the cam ring and configured to seal the accommodation space.

The cam ring and plate module according to the present disclosure may include an iron-based base material, and concretely, may include an iron-based base material including molybdenum.

The iron-based base material may include iron (Fe) as a main component, and in this case, may include at least 70%, 75%, 80%, 85%, 90%, 91%, 92%, 93%, 94%, 95%, 96%, 97% or 98% of iron (Fe).

The iron-based base material may include 0.6 to 0.8 wt % of carbon (C), 0.7 to 1.0 wt % of chrome (Cr), 0.1 to 0.2 wt % of molybdenum (Mo), and the balance of iron (Fe) and other inevitable impurities, based on 100 wt % of the total composition of the iron-based base material.

In the present disclosure, reasons for adding the respective components and limiting the contents of the components included in the iron-based base material are as follows.

(1) Carbon (C): 0.6 to 0.8 wt %

Carbon is added as the most powerful invasive base reinforcement element among chemical components. Strength is improved as a carbon content increases but, when an excessive amount of carbon is added, forgeability of the iron-based base material is reduced. When the carbon content is less than 0.6 wt % based on 100 wt % of the total composition of the iron-based base material, the iron-based base material may not acquire strength and hardness required as a cam ring and plate module for electronic vehicle vacuum pumps, and, when the carbon content exceeds 0.8 wt % based on 100 wt % of the total composition of the iron-based base material, toughness of the iron-based base material is reduced, and therefore, the carbon content is adjusted to 0.6 to 0.8 wt %.

(2) Chrome (Cr): 0.7 to 1.0 wt %

Chrome is a hardenability improvement element and also properly improves strength, and may thus improve torsional properties and mechanical properties without lowering cutting machinability. When a chrome content is less than 0.7 wt % based on 100 wt % of the total composition of the iron-based base material, strength and hardenability of the iron-based base material may be lowered, and, when the chrome content exceeds 1.0 wt % based on 100 wt % of the total composition of the iron-based base material, strength of the iron-based base material is improved but forgeability of the iron-based base material is reduced, and therefore, the chrome content is adjusted to 0.7 to 1.0 wt %.

(3) Molybdenum (Mo): 0.1 to 0.2 wt %

Molybdenum is advantageous in increase in strength, hardenability and corrosion resistance of the iron-based base material, but, when a molybdenum content is excessive, strength of the iron-based base material exceeds a target strength, and manufacturing costs of the iron-based base material are greatly raised due to the high price of molybdenum. Further, molybdenum serves as a solid dissolution strengthening element in the same manner as copper (Cu). However, in contrast to copper (Cu), molybdenum is dissolved in iron (Fe) during a sintering process and may thus provide the above-described effects without forming coarse pores, and therefore, the molybdenum is adjusted to 0.1 to 0.2 wt %.

In the present disclosure, the iron-based base material may not include copper (Cu).

In the present disclosure, the density of the cam ring, the upper plate and the lower plate may be 6.7 to 7.1 g/cm$^3$, and preferably, 6.8 to 7.0 g/cm$^3$.

In the present disclosure, the tensile strength of the cam ring, the upper plate and the lower plate may be 350 to 510 MPa, preferably, 400 to 460 MPa, and more preferably, 420 to 440 MPa.

An oxide layer may be formed on the surfaces of the cam ring, the upper plate and the lower plate, and the oxide layer may include magnetite ($Fe_3O_4$).

The average surface roughness Ra of the oxide layer may be equal to or greater than 0.12 μm, and preferably, equal to or greater than 0.13 μm.

Further, the oxide layer may include a carbon layer on the surface thereof, and the average surface roughness Ra of the carbon layer may be less than 0.05 μm, and preferably, less than 0.04 μm. The average surface roughness of the cam ring, the upper plate and the lower plate according to the present disclosure may be relatively high before the carbon layer is formed on the oxide layer, but may be remarkably reduced after the carbon layer has been formed on the oxide layer. Thereby, surface friction may be reduced, the RPM of the rotor and the vanes may be increased due to torque decrease caused by easy rotation of the rotor and the vanes, and the durability of the vanes, the cam ring and the upper and lower plates may be increased due to decrease in the amounts of wear of parts of the cam ring and plate module. Further, the carbon layer may serve as a coating layer so as to prevent a fluid from leaking and thus to increase seal resistance.

A method of manufacturing a cam ring and plate module for vehicle vacuum pumps according to another embodiment of the present disclosure may include forming a molded body having the shape of a cam ring or a plate from an iron-based base material including molybdenum using a press die, and forming an oxide layer on the surface of the molded body by performing steam treatment on the molded body.

The press die may employ any known press die which may form the molded body having the shape of the cam ring or the plate.

In the formation of the molded die, iron-based powder including 0.6 to 0.8 wt % of carbon (C), 0.7 to 1.0 wt % of chrome (Cr), 0.1 to 0.2 wt % of molybdenum (Mo), and the balance of iron (Fe) and other inevitable impurities, may be compression-molded, and may be sintered at a melting temperature or lower.

In the present disclosure, the density of the molded body may be 6.7 to 7.1 g/cm$^3$, and preferably, 6.8 to 7.0 g/cm$^3$.

In the present disclosure, the tensile strength of the molded body may be 350 to 510 MPa, preferably, 400 to 460 MPa, and more preferably, 420 to 440 MPa.

In the formation of the oxide layer, steam may be applied to the molded body so as to execute a reaction represented by Reaction Equation 1 below on the surface of the molded body.

$$3Fe+4H_2O\ (gas)\rightarrow Fe_3O_4+4H_2\ (gas) \qquad \text{Reaction equation 1:}$$

In such steam treatment, steam ($H_2O$) of a temperature of 450 to 600° C., 450 to 585° C., 500 to 600° C., 500 to 585° C., 550 to 600° C. or 550 to 585° C. may be applied to the molded body. When the temperature of steam is less than 450° C., the reaction speed of the reaction represented by Reaction Equation 1 on the surface of the iron-based base material is very low, and, when the temperature of steam is higher than 600° C., a side reaction, i.e., a reaction represented by Reaction Equation 2 below, occurs, and thus, FeO having lower physiochemical stability than magnetite ($Fe_3O_4$) may be generated.

$$Fe+H_2O\ (gas)\rightarrow FeO+H_2\ (gas) \qquad \text{Reaction Equation 2:}$$

Such steam treatment may be performed for 20 to 60 minutes, 30 to 60 minutes, 40 to 60 minutes or 50 to 60 minutes. When the steam treatment time is shorter than 20 minutes, a sufficient amount of magnetite ($Fe_3O_4$) may not be generated, and, when the stem treatment time exceeds 60 minutes, increase in the thickness of the oxide layer including magnetite ($Fe_3O_4$) may be insignificant and the oxide layer may be at the risk of peeling off.

The method may include stacking a carbon layer on the oxide layer by causing the molded body having the oxide layer formed thereon to come into contact with carbon or graphite.

Such contact may indicate contact of a cam ring and upper lower plates with vanes formed of carbon or graphite by rotation of the vanes during the operating process of the vehicle vacuum pump, but is not limited thereto.

The carbon layer stacked on the oxide layer according to the present disclosure may increase corrosion resistance, wear resistance, hardness and seal resistance of the cam ring and plate module for vehicle vacuum pumps.

and plate module while smoothly rotating the rotor 210 and the vanes 220.

Concretely, the cam ring 130, the upper plate 110 and the lower plate 120 may include an iron-based base material including molybdenum, a cam ring and plate module formed of the iron-based base material according to one embodiment of the present disclosure (Example) and a cam ring and plate module formed of SS-304L, which is a conventional stainless steel material, (Comparative Example) are prepared, and results of property comparison between the cam ring and plate module according to Example and the cam ring and plate module according to Comparative Example are set forth in Table 1.

TABLE 1

| | Component (wt %) | | | | Density | Tensile strength | Rust | | |
|---|---|---|---|---|---|---|---|---|---|
| Category | C | Cr | Ni | Mo | (g/cm$^3$) | (MPa) | prevention | Formability | Processibility |
| Example | 0.6-0.8 | 0.7-1.0 | — | 0.1-0.2 | 6.9 | 430 | ○ | ◎ | ◎ |
| Comp. Example (SS-304L) | 0.00-0.03 | 18.0-20.0 | 8.0-12.0 | — | 6.5 | 320 | ◎ | Δ | Δ |

Here, ○: excellent, ◎: good, and Δ: normal.

FIG. 1 is an exploded perspective view of a cam ring and plate module for vehicle vacuum pumps according to one embodiment of the present disclosure.

Concretely, the cam ring and plate module according to the present disclosure may include a cam ring 130 including an accommodation space 132 configured to receive a rotor 210 and vanes 220, and a diaphragm 134 configured to surround the accommodation space 132, an upper plate 110 disposed at one side of the cam ring 130 and configured to seal the accommodation space 132, and a lower plate 120 disposed at the other side of the cam ring 130 and configured to seal the accommodation space 132.

Referring to FIG. 1, a vehicle vacuum pump may confirm combination relations among the cam ring 130, the upper plate 110, the lower plate 120, and the rotor 210 and the vanes 220 received in the cam ring 130, and a principle of generating a vacuum by a pump unit including the cam ring 130, the upper plate 110, the lower plate 120, the rotor 210 and the vanes 220 will be described as below.

Similar to a rotary slide method, the rotor 210 and the vanes 220 received in the accommodation space 132 of the cam ring 130 are rotated along the inner circumferential surface of the diaphragm 134 of the cam ring 130 to inhale air. For example, air may be inhaled into the cam ring and plate module through an inlet 112 of the upper plate 110, and may be discharged to the outside through an outlet 122 of the lower plate 120. The vanes 22 is rotated along the inner profile of the cam ring 130 to trap, transfer and discharge air. The vacuum may be generated in a brake booster of the brake system via the process of rotating the rotor 210 and the vanes 220.

Figure 2A:
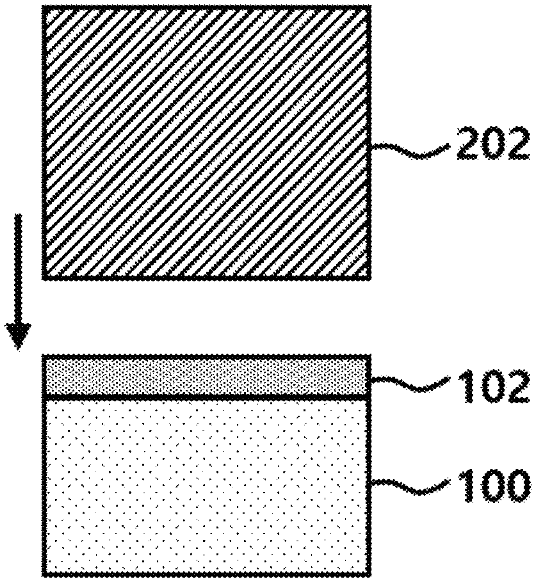
FIGS. 2A, 2B, and 2C are schematic views illustrating formation of an oxide layer and a carbon layer on the cam ring and plate module according to one embodiment of the present disclosure.
Figure 2B:
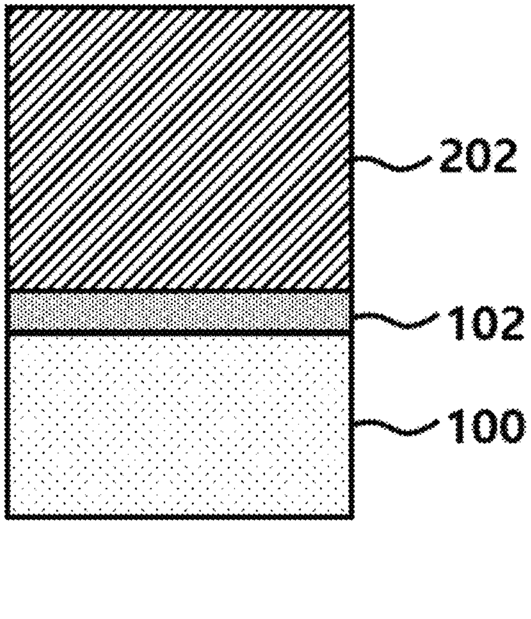
Figure 2C:
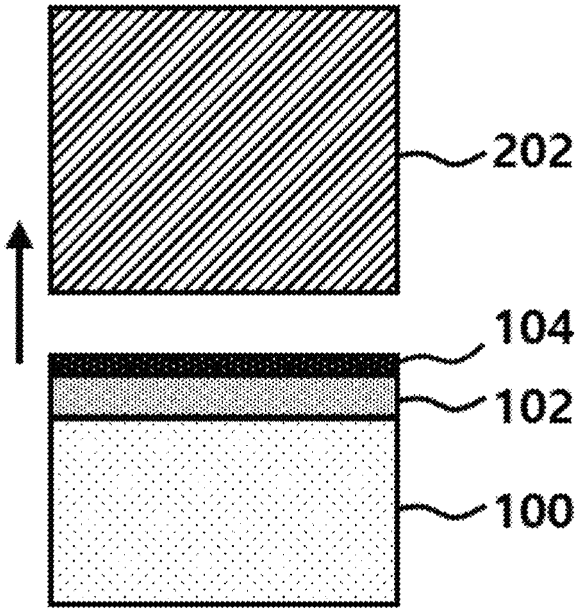

Thereby, the cam ring and plate module according to the present disclosure improves a material for the cam ring 130 and the upper plate 110 and the lower plate 120 configured to close the upper and lower parts of the cam ring 130, and includes the oxide layer formed on the surfaces of the cam ring 130 and the upper and lower plates 110 and 120, thereby being capable of improving corrosion resistance, wear resistance, hardness and seal resistance of parts of the cam ring FIGS. 2A to 2C are schematic views illustrating formation of an oxide layer and a carbon layer on the cam ring and plate module according to one embodiment of the present disclosure.

The oxide layer 102 and the carbon layer 104 may be sequentially stacked on the surface 100 of the cam ring and plate module. Concretely, as shown in FIG. 2A, the oxide layer 102 including an iron oxide may be formed on the surface 100 of the cam ring and plate module by performing steam treatment thereon. The iron oxide may include magnetite ($Fe_3O_4$). As shown in FIG. 2B, a carbon material 202, such as carbon or graphite, may slide in one direction with respect to the surface of the oxide layer 102 while coming into contact with the oxide layer 102. For example, the carbon material 202 may be the rotor 210 or the vanes 220 of the vacuum pump. The rotor 210 and the vanes 220 may be rotated along the inner circumferential surface of the diaphragm 134 of the cam ring 130 while coming into contact with the diaphragm 134. Further, the rotor 210 and the vanes 220 may also be rotated with respect to the upper plate 110 or the lower plate 120. As shown in FIG. 2C, when rotation of the carbon material 202 is completed and is then separated from the oxide layer 102, the carbon layer 104 formed by transferring carbon to the oxide layer 102 may be stacked on the oxide layer 102.

Figure 3:
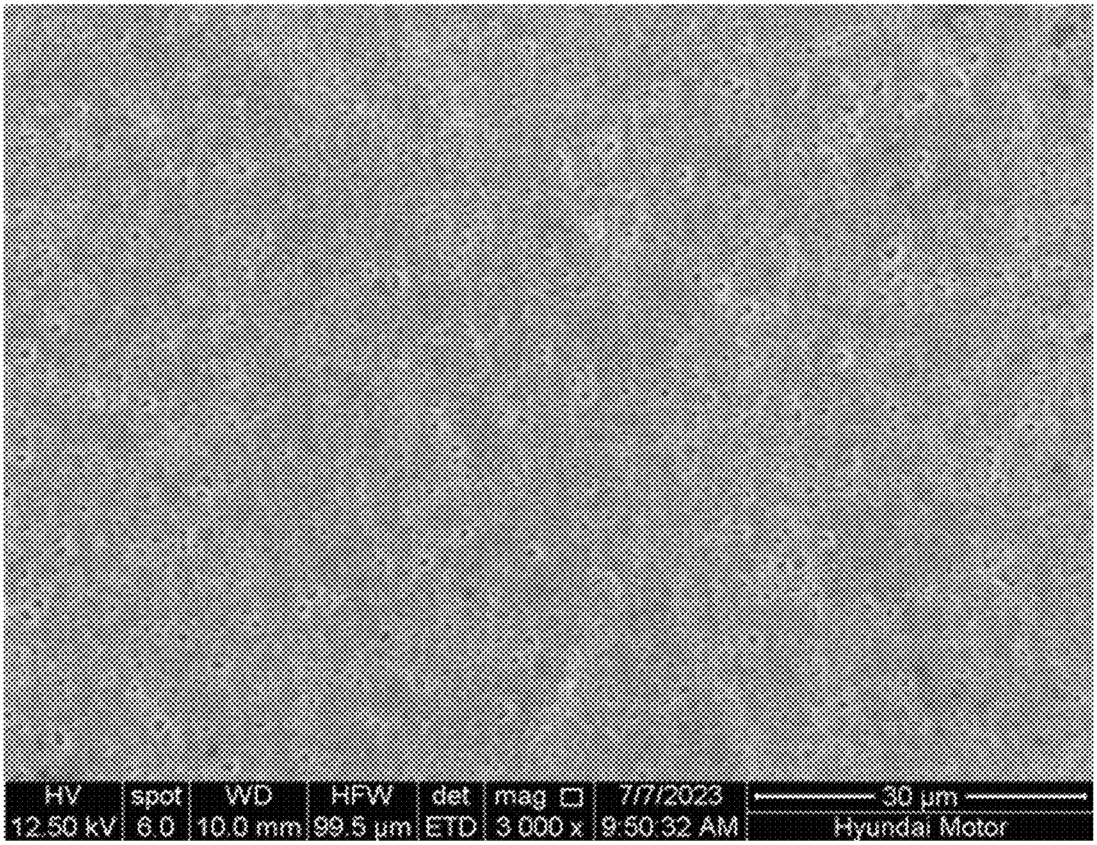
FIG. 3 is a photograph of the oxide layer formed on the cam ring and plate module according to one embodiment of the present disclosure.

FIG. 3 is a photograph of the oxide layer 102 formed on the cam ring and plate module according to one embodiment of the present disclosure. Referring to this figure, it may be confirmed that concave and convex microstructures are formed on the surface of the oxide layer 102.

Figure 4:
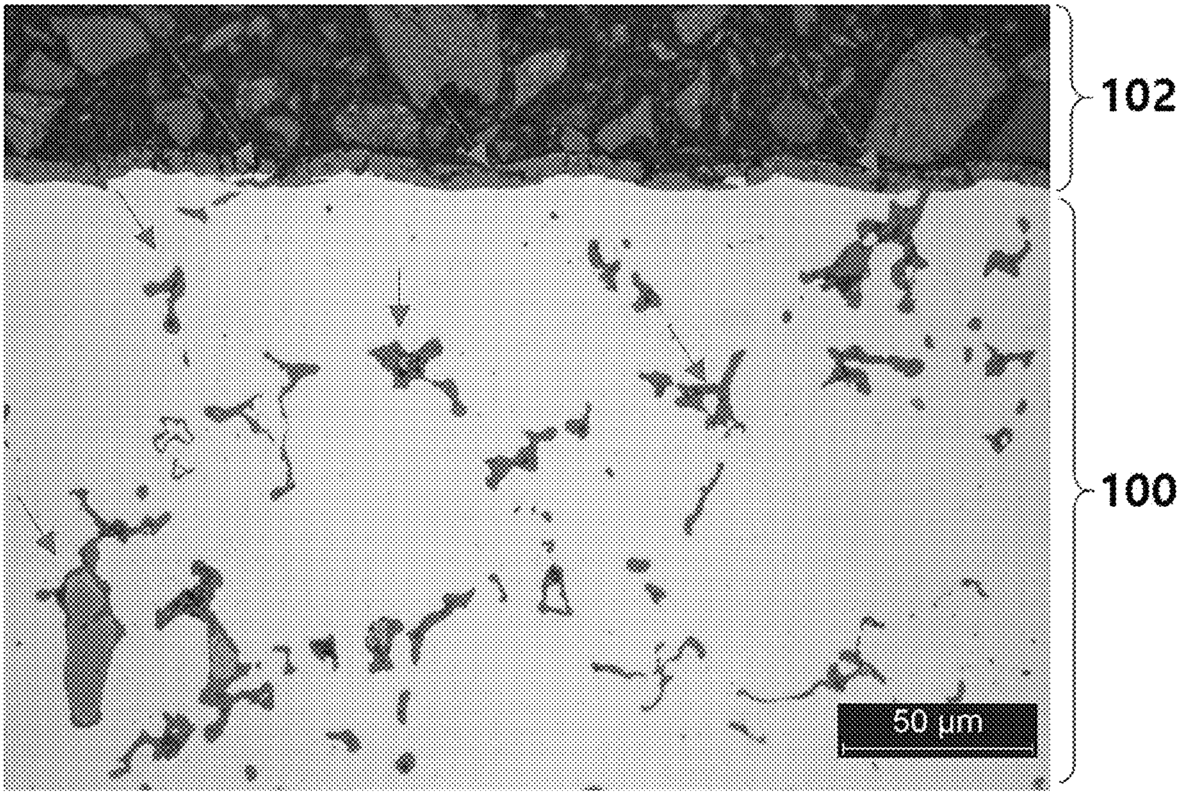
FIG. 4 is a photograph showing the cross section of the oxide layer formed on the cam ring and plate module according to one embodiment of the present disclosure.

FIG. 4 is a photograph showing the cross section of the oxide layer 102 and, referring to this figure, it may be confirmed that the oxide layer 102 is coated on the surface 100 of the metal base material, and the oxide fills pores formed in the metal base material during the sintering process.

Figure 5A:
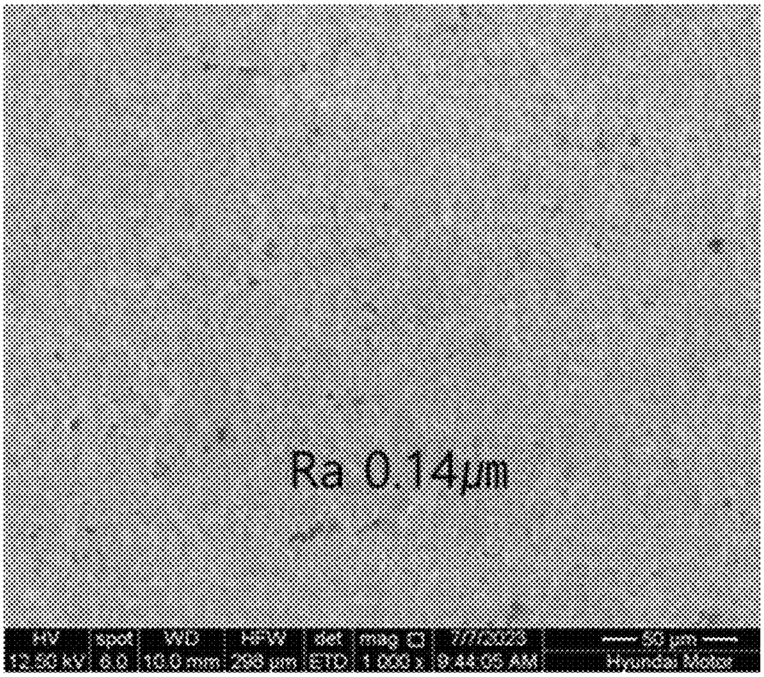
FIGS. 5A and 5B are photographs showing the cam ring and plate module formed of an iron-based base material according to one embodiment of the present disclosure before and after the carbon layer is formed on the oxide layer by contact of the oxide layer with carbon.
Figure 5B:
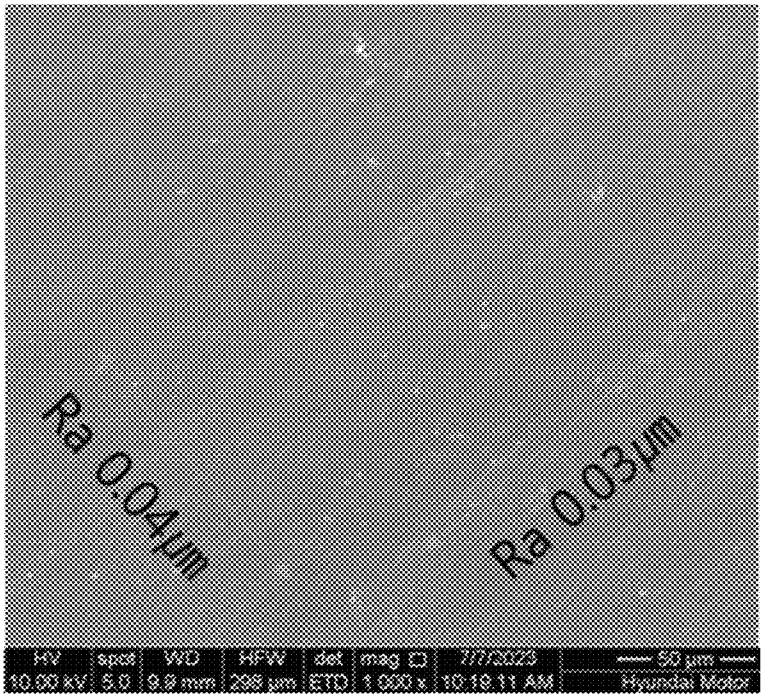

FIGS. 5A and 5B are photographs showing the cam ring and plate module formed of the iron-based base material according to one embodiment of the present disclosure before and after the carbon layer 104 is formed on the oxide layer 102 by contact of the oxide layer 102 with carbon. Referring to these figures, it may be confirmed that the average surface roughness Ra of the oxide layer 102 is 0.14 μm before the carbon layer 104 is formed on the oxide layer 102, and the average surface roughness Ra of the carbon layer 104 is 0.03 to 0.04 μm depending on a measurement direction after the carbon layer 104 is formed on the oxide layer 102.

Figure 6A:
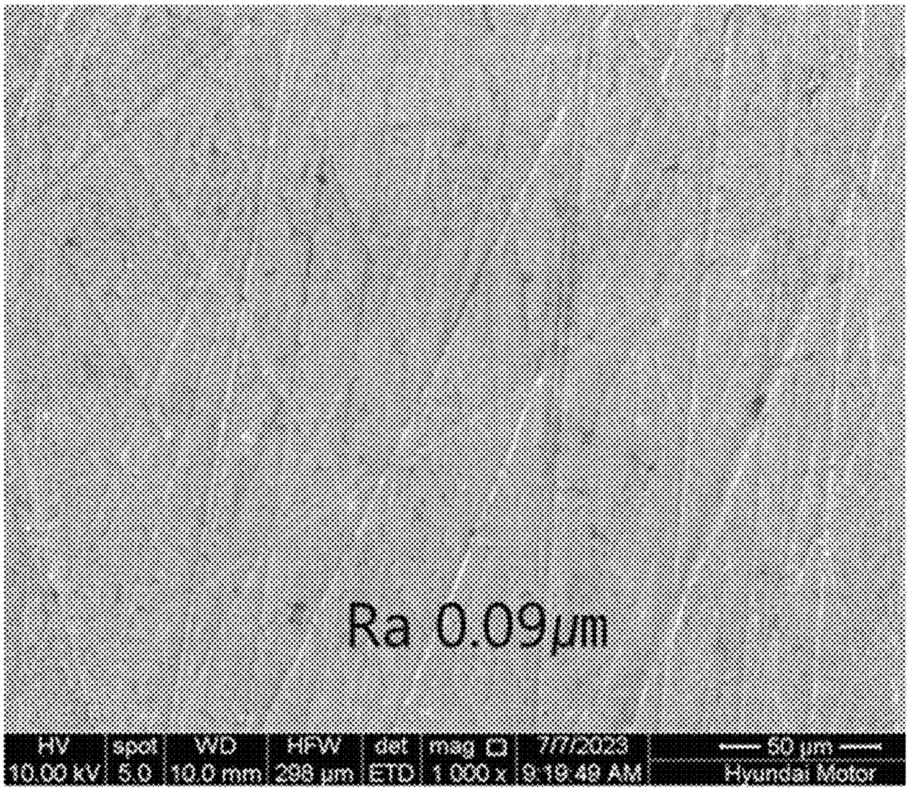
FIGS. 6A and 6B are photographs showing a cam ring and plate module formed of SS-304L according to a comparative example before and after contact with carbon.
Figure 6B:
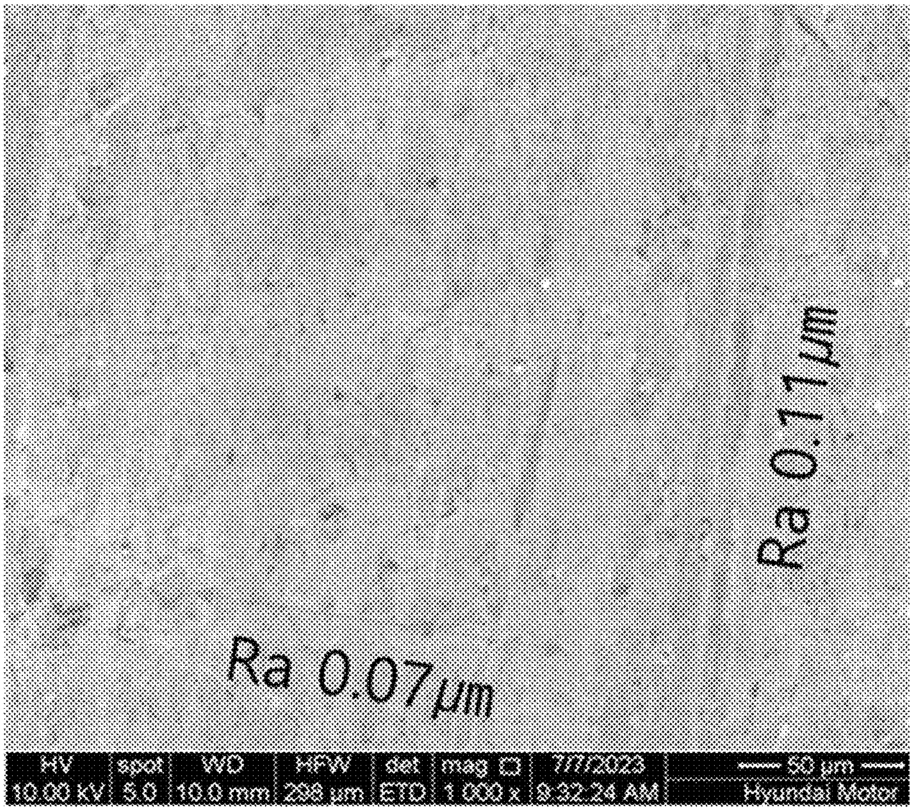

FIGS. 6A and 6B are photographs showing a cam ring and plate module formed of SS-304L according to the comparative example before and after contact with carbon. Referring to these figures, it may be confirmed that the average surface roughness Ra of the cam ring and plate module is 0.09 μm before contact with carbon, and the average surface roughness Ra of the cam ring and plate module is 0.07 to 0.11 μm depending on a measurement direction after contact with carbon.

Here, the average surface roughness Ra is an index, which is acquired by evaluating surface abrasion, roughness or uniformity and indicates surface quality, and a high value of the average surface roughness Ra means that the surface is rough.

Results of measurement of the surface roughness values of the iron-based base material according to Example and the stainless steel material according to Comparative Example, which are changed before and after formation of the carbon layer thereon, three times are set forth in Table 2 below.

TABLE 2

| Category | Carbon layer | Measurement direction | #1 | #2 | #3 |
|---|---|---|---|---|---|
| Example | Before formation | Random | 0.14 | 0.13 | 0.14 |
| | After formation | Vertical | 0.06 | 0.06 | 0.06 |
| | | Rotation | 0.03 | 0.03 | 0.03 |
| Comp. Example | Before formation | Random | 0.09 | 0.09 | 0.10 |
| | After formation | Vertical | 0.10 | 0.11 | 0.11 |
| | | Rotation | 0.09 | 0.07 | 0.05 |

Referring to Table 2, it may be confirmed that the average surface roughness of the iron-based base material according to Example is lowered after formation of the carbon layer 104, compared to the stainless steel material according to Comparative Example.

Further, sealing performances of modules for vacuum pumps using the iron-based base material according to Example and the stainless steel material according to Comparative Example were tested. The sealing performances were tested under conditions of an applied voltage of 12 V±0.1 V, a nominal current of 10 A or less applied for 400 ms or more, a starting current of 60 A or less applied for less than 400 ms, an external temperature of 23° C.±5° C., and an initial pressure of a vacuum tank of 760 mmHg±5 mmHg, and results of measurement of times taken for the vacuum pumps using the iron-based base material according to Example and the stainless steel material according to Comparative Example to reach negative pressures three times are set forth in Table 3 below.

TABLE 3

| Category | Negative pressure (mmHg) | #1 | #2 | #3 |
|---|---|---|---|---|
| Example | 385 | 4.37 | 4.19 | 3.89 |
| | 535 | 8.83 | 8.39 | 7.69 |
| Comp. Example | 385 | 4.71 | 4.68 | 4.77 |
| | 535 | 9.87 | 9.41 | 9.07 |

Referring to Table 3, times taken for the vacuum pump using the stainless steel material according to Comparative Example to reach a negative pressure of 385 mmHg were less than 5 seconds, and times taken for the vacuum pump using the stainless steel material according to Comparative Example to reach a negative pressure of 535 mmHg were less than 10.5 seconds, and therefore, it may be confirmed that the vacuum performance of the vacuum pump using the stainless steel material according to Comparative Example was good. However, it may be confirmed that the vacuum pump using the iron-based base material according to Example reached the negative pressures of 385 mmHg and 535 mmHg within a shorter time, and thus exhibits better sealing performance.

Accordingly, the present disclosure provides a cam ring and plate module for vehicle vacuum pumps which has increased corrosion resistance, wear resistance, hardness and seal resistance, and is advantageous in manufacture of the cam ring and plate module.

As is apparent from the above description, a cam ring and plate module for vehicle vacuum pumps according to the present disclosure may form a carbon layer on an oxide layer, formed on a diaphragm surrounding an accommodation space of a cam ring and upper and lower plates, by transferring carbon from a rotor and vanes formed of a carbon or graphite material to the oxide layer, thereby being capable of improving corrosion resistance, wear resistance, hardness and seal resistance of the cam ring and plate module.

Further, in a method of manufacturing the cam ring and plate module according to the present disclosure, the oxide layer may be uniformly formed by applying steam to the diaphragm surrounding the accommodation space of the cam ring and the upper and lower plates, and thereby, the average surface roughness of the oxide layer may be increased so that carbon may be easily transferred to the oxide layer.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A cam ring and plate module for vehicle vacuum pumps, comprising:

a cam ring comprising an accommodation space configured to receive a rotor and a plurality of vanes, and a diaphragm configured to surround the accommodation space;

an upper plate positioned at one side of the cam ring and configured to seal the accommodation space; and a lower plate positioned at an opposite side of the cam ring and configured to seal the accommodation space;

wherein the cam ring, the upper plate, and the lower plate each comprise an iron-based base material comprising molybdenum; and wherein the cam ring, the upper plate, and the lower plate each comprise an oxide layer comprising magnetite ($Fe_3O_4$) formed on surfaces thereof.

2. The cam ring and plate module of claim 1, wherein the iron-based base material comprises, based on 100 wt % of a total composition of the iron-based base material:

0.6 to 0.8 wt % of carbon (C);

0.7 to 1.0 wt % of chrome (Cr);

0.1 to 0.2 wt % of molybdenum (Mo); and a balance of iron (Fe) and other inevitable impurities.

3. The cam ring and plate module of claim 1, wherein average surface roughness Ra of the oxide layer is equal to or more than 0.12 μm.

4. The cam ring and plate module of claim 1, wherein the cam ring, the upper plate, and the lower plate each further comprise:

a carbon layer stacked on the oxide layer.

5. The cam ring and plate module of claim 4, wherein average surface roughness Ra of the carbon layer is less than 0.05 μm.

* * * * *